United States Patent
Kim et al.

(10) Patent No.: US 7,964,167 B2
(45) Date of Patent: Jun. 21, 2011

(54) METHOD AND ARCHITECTURE FOR OXIDIZING NITRIC OXIDE IN EXHAUST GAS FROM HYDROCARBON FUEL SOURCE WITH A FUEL LEAN COMBUSTION MIXTURE

(75) Inventors: Chang H Kim, Rochester, MI (US); Wei Li, Troy, MI (US); Kevin A Dahlberg, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/563,345

(22) Filed: Sep. 21, 2009

(65) Prior Publication Data

US 2010/0086458 A1    Apr. 8, 2010

Related U.S. Application Data

(60) Provisional application No. 61/102,462, filed on Oct. 3, 2008.

(51) Int. Cl.
*B01D 53/56* (2006.01)
*B01D 53/74* (2006.01)
*B01D 53/86* (2006.01)
*B01D 53/94* (2006.01)
*F01N 3/10* (2006.01)

(52) U.S. Cl. ............... 423/213.2; 423/213.5; 423/213.7; 423/239.1; 423/DIG. 5; 423/DIG. 6; 422/105; 422/177; 422/180; 60/276; 60/299; 60/301; 502/525

(58) Field of Classification Search ............... 423/213.2, 423/213.5, 213.7, 239.1, DIG. 5, DIG. 6; 422/105, 177, 180; 60/276, 299, 301; 502/525

See application file for complete search history.

(56) References Cited

U.S. PATENT DOCUMENTS

| | | | | |
|---|---|---|---|---|
| 4,001,371 | A | * | 1/1977 | Remeika et al. ........... 423/213.2 |
| 4,921,829 | A | * | 5/1990 | Ozawa et al. ............... 502/302 |
| 5,185,311 | A | * | 2/1993 | Tabata et al. ............... 502/304 |
| 5,447,705 | A | | 9/1995 | Petit et al. |
| 5,562,888 | A | * | 10/1996 | Rajadurai .................. 423/239.1 |
| 5,622,680 | A | * | 4/1997 | Monceaux et al. ........ 423/213.5 |
| 6,352,955 | B1 | | 3/2002 | Golden |
| 6,616,904 | B1 | * | 9/2003 | Becue et al. ............... 423/239.1 |
| 6,919,047 | B1 | * | 7/2005 | He et al. ....................... 422/122 |
| 7,247,258 | B2 | | 7/2007 | Jung et al. |
| 7,375,054 | B2 | * | 5/2008 | Eguchi et al. ............... 502/330 |
| 7,514,055 | B2 | * | 4/2009 | Golden ...................... 423/213.2 |
| 7,641,875 | B1 | * | 1/2010 | Golden ...................... 423/213.5 |
| 2003/0198582 | A1 | * | 10/2003 | Golden ...................... 423/213.2 |
| 2007/0006578 | A1 | * | 1/2007 | Tanaami et al. ................. 60/299 |
| 2007/0105715 | A1 | * | 5/2007 | Suda et al. ..................... 502/303 |
| 2010/0209326 | A1 | * | 8/2010 | Gandhi et al. ............. 423/239.1 |
| 2010/0233045 | A1 | * | 9/2010 | Kim et al. ..................... 422/177 |

FOREIGN PATENT DOCUMENTS

JP          6-304449 A   * 11/1994
WO       WO 90/08589 A1 *  8/1990

* cited by examiner

*Primary Examiner* — Timothy C Vanoy
(74) *Attorney, Agent, or Firm* — Reising Ethington P.C.

(57) ABSTRACT

An after-treatment system architecture and method for oxidizing the nitric oxide component of an exhaust stream from a hydrocarbon fueled power source operated with a fuel lean combustion mixture.

20 Claims, 2 Drawing Sheets

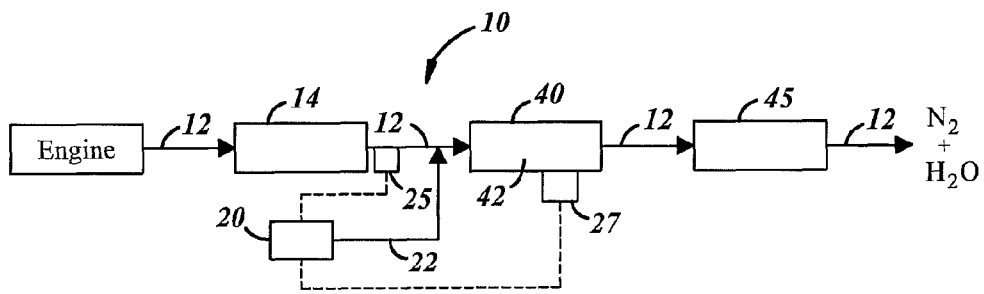
*FIG. 1*
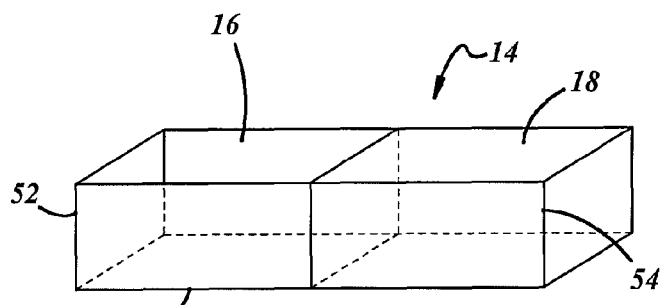
*FIG. 2*
Performance of Catalysts
| La | Sr | Co | Mn | Conversion at 325 °C (%) | S.A. ($m^2/g$) |
|---|---|---|---|---|---|
| 1 | 0 | 1 | 0 | 79 | 10.6 |
| 1 | 0 | 1 | 0 | 78 | 66.4 |
| 0.9 | 0.1 | 1 | 0 | 86 | 20.4 |
| 0.8 | 0.2 | 1 | 0 | 84 | 34.7 |
| 0.7 | 0.3 | 1 | 0 | 79 | 12.4 |
| 1 | 0 | 0 | 1 | 70 | 7.4 |
| 1 | 0 | 0 | 1 | 62 | 11.3 |
| 0.9 | 0.1 | 0 | 1 | 64 | 14.5 |
| Commercial Platinum Catalysts | | | | 45 | - |
*FIG. 3*

US 7,964,167 B2

METHOD AND ARCHITECTURE FOR OXIDIZING NITRIC OXIDE IN EXHAUST GAS FROM HYDROCARBON FUEL SOURCE WITH A FUEL LEAN COMBUSTION MIXTURE

CROSS REFERENCE TO RELATED APPLICATIONS

This application claims the benefit of U.S. Provisional Application Ser. No. 61/102,462 filed Oct. 3, 2008.

TECHNICAL FIELD

The field to which the disclosure generally relates to includes treatment of exhaust gas from a hydrocarbon fueled power source, such as a diesel engine, operated with a fuel lean combustion mixture. More specifically, this invention pertains to method and architecture for the oxidation of the nitric oxide component in exhaust gas.

BACKGROUND

Diesel engines, some gasoline fueled engines and many hydrocarbon fueled power plants, are operated at higher than stoichiometric air to fuel mass ratios for improved fuel economy. Such lean-burning engines and other power sources, however, produce a hot exhaust with a relatively high content of oxygen and nitrogen oxides ($NO_x$). In the case of diesel engines, the temperature of the exhaust from a warmed up engine is typically in the range of 200 degrees to 400 degrees Celsius, and has a typical composition, by volume, of about 10% oxygen, 6% carbon dioxide, 0.1% carbon monoxide, 180 ppm hydrocarbons, 235 ppm $NO_x$ and the balance nitrogen and water. These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

SUMMARY OF EXEMPLARY EMBODIMENTS OF THE INVENTION

The exemplary embodiments provide an after-treatment system architecture and method for oxidizing nitric oxide in an exhaust stream from a hydrocarbon fueled power source, such as a diesel engine, operated with a fuel lean combustion mixture.

In one exemplary embodiment, a perovskite catalyst of the general formula $ABO_3$ may be provided in a catalytic oxidation reactor for oxidizing nitric oxide in an exhaust stream of a lean burning hydrocarbon fueled power source, wherein A represents a rare earth metal from the Lanthanide Series and/or an alkaline-earth metal, and wherein B represents a transition metal.

In another exemplary embodiment, the catalytic performance of the perovskite catalyst of the general formula $ABO_3$ as described above may be enhanced by the substitution of a small amount of a promoter material for a portion of element A or element B in the catalytic formulation.

In still another exemplary embodiment, an exhaust system for reducing $NO_x$ emissions may be provided that includes a catalytic oxidation reactor having the perovskite catalyst of the general formula $ABO_3$ as described above.

An associated exemplary method of use of the perovskite catalyst to oxidize nitric oxide in an exhaust stream from a hydrocarbon fueled power source, such as a diesel engine, operated with a fuel lean combustion mixture in accordance with the exemplary embodiments described above may also be provided.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 is a schematic flow diagram of an exhaust system for a hydrocarbon fueled power source having a perovskite catalyst for oxidizing nitric oxide to nitrogen dioxide in accordance with an exemplary embodiment;

FIG. 2 is a close-up view of the catalytic oxidation reactor of FIG. 1;

FIG. 3 is a table describing the performance of the perovskite catalysts according to the exemplary embodiment in oxidizing nitric oxide versus a conventional platinum catalyst;

DETAILED DESCRIPTION OF EXEMPLARY EMBODIMENTS

Figure 4:
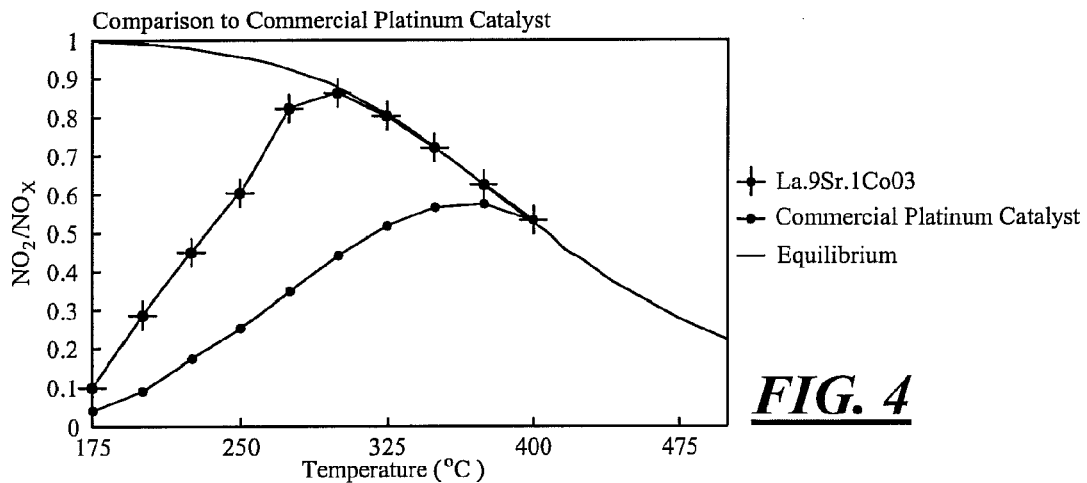
FIG. 4 is a graphical illustration of the nitric oxide oxidation performance of $LaCoO_3$ versus a commercial platinum NO oxidation catalyst over a wide range of temperatures.

The following description of the embodiment(s) is merely exemplary (illustrative) in nature and is in no way intended to limit the invention, its application, or uses A flow diagram of an exhaust system 10 for a lean burning hydrocarbon fueled power source is illustrated according to one exemplary embodiment in FIG. 1. An exhaust stream 12 from the exhaust manifold of an engine operating at an air-to-fuel mass ratio well above the stoichiometric ratio is to be treated to reduce the $NO_x$ (mainly a mixture of NO and $NO_2$ with some $N_2O$) content to nitrogen ($N_2$). When the exhaust stream 12 is from a gasoline-fueled engine operated, for example, at an air to fuel ratio of greater than 17 (i.e. A/F>17), the exhaust gas contains some unburned hydrocarbons (HC), $NO_x$, carbon monoxide (CO), carbon dioxide ($CO_2$), water ($H_2O$), oxygen ($O_2$), and nitrogen ($N_2$). The fuel used may include, but is not limited to, gasoline and diesel fuel. The exhaust stream 12 from a diesel engine contains the same gaseous constituents plus suspended diesel particulates (composed of high molecular weight hydrocarbons deposited on carbon particles).

Such hydrocarbon containing exhaust streams 12 may be passed through a catalytic oxidation reactor 14, which substantially completes the oxidation of carbon monoxide to carbon dioxide and the oxidation of hydrocarbons to carbon dioxide and water. There is typically abundant oxygen in the exhaust gas stream 12 for these reactions.

The catalytic oxidation reactor 14, as shown best in FIG. 2, may include a traditional ceramic substrate material 50 such as cordierite coated with a washcoat 54, here shown as coating the rear side portion 18, that includes a perovskite catalyst of the general formula $ABO_3$, wherein A represents a rare earth metal from the Lanthanide Series and/or an alkaline-earth metal (La, Sr, Ce, Ba, Pr, Nd, or Gd) and wherein B represents a transition metal (Co, Ni, Cu, Zn, Cr, V, Pt, Pd, Rh, Ru, Ag, Au, Fe, Mn, or Ti).

The perovskite catalyst primarily functions to oxidize nitric oxide (NO) to nitrogen dioxide ($NO_2$). Two exemplary perovskite catalysts of the general formula $ABO_3$ that may be utilized in the catalytic oxidation reactor 14 include $LaCoO_3$ and $LaMnO_3$.

In another exemplary embodiment, the catalytic performance of the perovskite catalyst of the general formula $ABO_3$ as described above may be enhanced by the substitution of a small amount of a promoter material for a portion of element A or element B in the catalytic formulation. Solid solutions of $ABO_3$ with $AA'BO_3$, $ABB'O_3$, or even $AA'BB'O_3$, may be utilized, wherein A' signifies a substitution of the promoter material for a portion of the A element, and wherein B' represents a substitution of the promoter material for a portion of the B element.

One exemplary promoter material is Strontium (Sr), and an exemplary formulation is $ASrBO_3$, wherein A and B are described as above. Two exemplary perovskite catalysts including the Strontium promoter material that may be utilized in the catalytic oxidation reactor 14 include $La_{1-x}Sr_xCoO_3$ and $La_{1-x}Sr_xMnO_3$.

Referring back to FIG. 2, a portion of the substrate material 50, here the front side portion 16, may be coated with a second washcoat 52 with platinum group metal (PGM) loading at about 5-150 $g/ft^3$ and may include platinum, palladium, a mixture of platinum and palladium, and other support materials. The second washcoat 52 may aid in oxidizing carbon monoxide to carbon dioxide and oxidizing hydrocarbons to carbon dioxide and water.

While the catalytic oxidation reactor 14 as shown in FIG. 2 includes a front side portion 16 including the second washcoat 52 and the rear side portion 18 including the first washcoat 54, other exemplary embodiments are specifically contemplated with other arrangements. For example, the entire substrate material 50 may be coated with both the first washcoat 54 and second washcoat 52, applied in consecutive steps or together in a single washcoat formulation. Alternatively, the entire substrate material 50 may be coated exclusively with the second washcoat 52 including the perovskite catalyst, depending upon the composition of the exhaust gas 12 and the desired treatment of the exhaust gas, and still fall within the spirit of the present invention.

Referring back to FIG. 1, ammonia ($NH_3$) or urea may also be added to exhaust stream 12 after the exhaust stream 12 exits the catalytic oxidation reactor 14. Ammonia can be stored in a suitable form (such as liquid ammonia or as urea) on-board a lean burn engine vehicle, or near-by a stationary engine, collectively referred to herein as an ammonia injector device 20, and may be added as a stream 22 to the exhaust stream 12 upstream of the catalytic reduction reactor 40 and the hydrocarbon particulate filter 45. The ammonia or urea from the stream 22 may participate in the reduction of nitric oxide (NO) and nitrogen dioxide ($NO_2$) to nitrogen ($N_2$).

The exhaust stream 12 treated with ammonia or urea then enters the catalytic reduction reactor 40. The catalytic reduction reactor 40 may include a selective catalytic reduction (SCR) catalyst 42 that functions primarily to substantially reduce NO and $NO_2$ (i.e. $NO_x$) to $N_2$ and water.

The SCR catalyst 42 may be formed from a washcoat (not shown) including a base metal as the active material contained in a zeolite material and other support materials (examples: Cu/ZSM-5, vanadia/titania etc.) coupled to a conventional substrate material such as cordierite. The base metal may aid in converting NO to $NO_2$ and subsequently converting $NO_2$ to $N_2$ and water which may be discharged through the tailpipe (not shown) as an emission.

Maximum reduction performance of the SCR catalyst 42 is often achieved at a substantially equimolar ratio (1:1 ratio) of NO and $NO_2$ in the exhaust stream 12, especially at lower temperatures (such as start up or warm up conditions) where the SCR catalyst 42 may not convert $NO_x$ to $N_2$ and water at its maximum efficiency. In addition, at the 1:1 ratio, the detrimental effects of high space velocity and SCR catalyst 42 aging may be minimized. As the engine-out $NO_x$ typically contains less than 10% $NO_2$, the oxidation catalyst 14 converts a portion of the engine-out NO to $NO_2$ to achieve a $NO/NO_2$ molar ratio closer to 1:1. When the temperature of the SCR catalyst 42, as measured by a temperature sensor 27, is sufficiently high (i.e. the temperature in which the SCR catalyst 42 may be operating at substantially peak efficiency to convert $NO_x$ regardless of exhaust gas 12 composition), the benefit of the equimolar $NO/NO_2$ ratio is diminished.

In order to achieve high $NH_3$ SCR efficiencies, the ratio of $NH_3$ to $NO_x$ must also be carefully maintained at close to 1:1. The ammonia or urea added from the injector device 20 to the exhaust stream 12 prior to entering the catalytic reduction reactor 40 therefore may be controlled to achieve this equimolar ratio. This control can be done by measuring the concentration of NOx in the exhaust stream using a $NO_x$ sensor 25 and controlling the amount of ammonia or urea injected from the injector device 20 as a function of the $NO_x$ measurement to achieve the desired 1:1 ratio.

Finally, the exhaust stream 12 flows through a particulate filter 45 to remove any remaining particulate matter and exits through a tailpipe (not shown) or similar type device to the atmosphere. In alternative exemplary arrangements, the particulate filter 45 may filter the exhaust stream 12 prior to entering the catalytic reduction reactor 40. The particulate filter 45 may be formed from various materials, including cordierite or silicone-carbide, which traps particulate matter.

Referring now to FIG. 3, a table is provided that compares the performance of various perovskite catalysts in accordance with the exemplary embodiments, in terms of the percentage of nitric oxide oxidation at 325 degrees Celsius, of the general formula $LaBO_3$ (B=Co or Mn) coupled to a conventional cordierite substrate material at various loadings (S.A. "Surface Area" refers to the specific surface area per unit mass of the catalytic materials), with and without a Strontium promoter, with commercially available platinum catalysts. The perovskite catalysts were prepared by the method described below in the Examples Section.

As shown in FIG. 3, the perovskite catalysts of the general formula $LaBO_3$ offered significant improvement of the oxidation of nitric oxide at 325 degrees Celsius as compared with the conventional platinum catalyst provided. Moreover, the addition of the Strontium promoter in increasing levels relative to Lanthanum, as exemplified by the general formula $La_{1-x}Sr_xBO_3$, appears to result in incremental improvements in nitric oxide oxidation as well.

FIG. 4 compares the performance of one exemplary perovskite catalyst including the Strontium promoter, $La_{0.9}Sr_{0.1}CoO_3$, versus a commercial platinum based catalyst, over a wide range of temperatures. The nitric oxide oxidation was confirmed by measuring the relative content of nitrogen dioxide in the $NO_x$ component of the exhaust stream at various temperatures. Here, the exhaust stream does not include water, carbon dioxide or hydrocarbons. The results confirm that $La_{0.9}Sr_{0.1}CoO_3$ appears to oxidize a greater portion of nitric oxide over a wide temperature range than a traditional platinum based catalyst.

Figure 5:
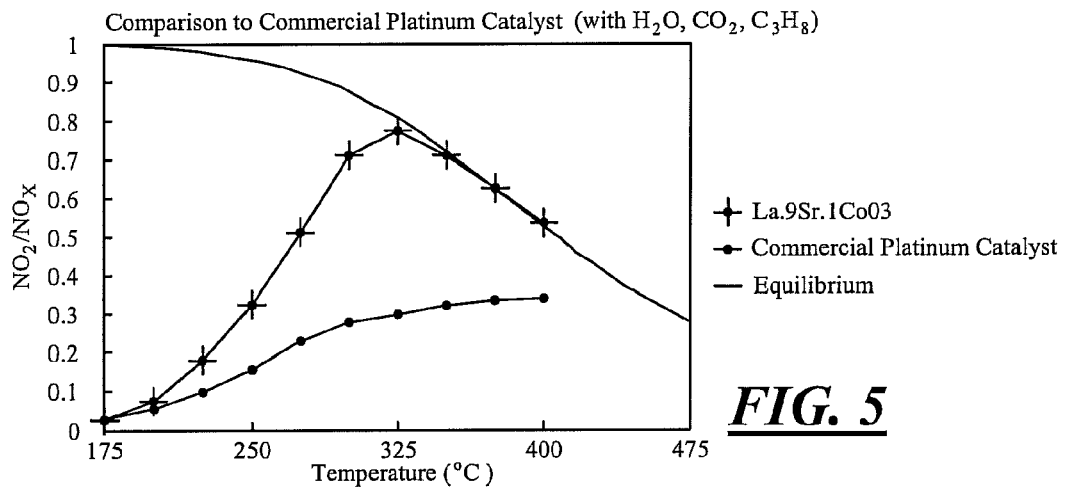
FIG. 5 is a graphical illustration of the nitric oxide oxidation performance of $La_{0.9}Sr_{0.1}CoO_3$ versus a commercial platinum catalyst over a wide range of temperatures.

FIG. 5 compares the performance of one exemplary perovskite catalyst including the Strontium promoter, $La_{0.9}Sr_{0.1}CoO_3$, versus a traditional platinum based catalyst, in terms of nitric oxide oxidation, over a wide range of temperatures in a typical lean exhaust stream containing water, carbon dioxide and hydrocarbons. The nitric oxide oxidation was confirmed by measuring the relative content of nitrogen dioxide in the $NO_x$ component of the exhaust stream at various temperatures. The results confirm that $La_{0.9}Sr_{0.1}CoO_3$ appears to oxidize a greater portion of nitric oxide in an exhaust stream including water, carbon dioxide and hydrocarbons over a wide temperature range.

Figure 6:
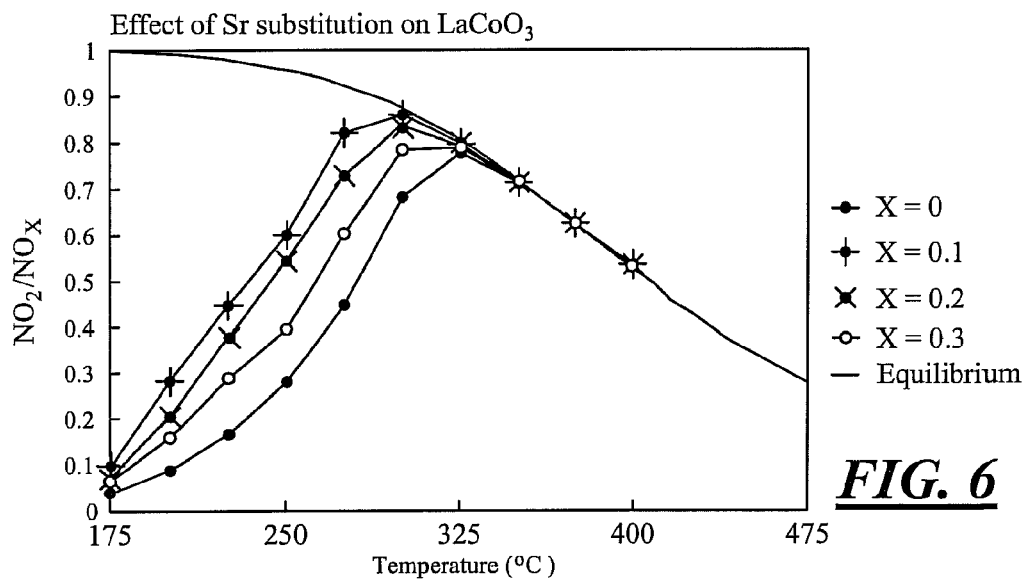
FIG. 6 is a graphical illustration of the nitric oxide oxidation performance of $La_{1-x}Sr_xCoO_3$ at various Sr loadings versus a commercial platinum catalyst over a wide range of temperatures.

FIG. 6 compares the performance of one exemplary perovskite catalyst, $La_{1-x}Sr_xCoO_3$ (x=0, 0.1, 0.2, 0.3), including the Strontium promoter, in terms of nitric oxide oxidation, over a wide range of temperatures in a typical lean exhaust stream containing water, carbon dioxide and hydrocarbons. FIG. 5 confirms that the addition of Strontium of as little as 10 molar percent of the Lanthanum component may improve the nitric oxide oxidation at various promoter levels as compared with the $LaCoO_3$.

The above description of embodiments of the invention is merely exemplary in nature and, thus, variations thereof are not to be regarded as a departure from the spirit and scope of the invention.

EXAMPLES

Catalyst Preparation $La_{1-x}Sr_xCoO_3$ (x=0, 0.1, 0.2, 0.3) and $La_{1-x}Sr_xMnO_3$ (x=0, 0.1) catalysts were prepared by citrate methods as shown in Table 1 below. In the methods, appropriate amounts of $La(NO_3)_3 \cdot 6H_2O$, $Co(NO_3)_2 \cdot 6H_2O$, $Mn(NO_3)_2$ solution, and $Sr(NO_3)_2$ were dissolved in distilled water with citric acid monohydrate. Citric acid was added in about a 10 weight percent excess to ensure complete complexation of the metal ions. The amount of water used was about 46.2 mL/g $La(NO_3)_3 \cdot 6H_2O$. The solution was set on a stirring and heating plate and stirred for 1 hour, then heated to about 80 degrees Celsius under continued stirring.

TABLE 1

|  | $LaCoO_3$ | $La_{0.9}Sr_{0.1}CoO_3$ | $LaMnO_3$ |
| --- | --- | --- | --- |
| $La(NO_3)_3 \cdot 6H_2O$ | 17.61 g | 35.62 g | 27.60 g |
| $Sr(No_3)_2$ | — | 1.93 g | — |
| $Co(NO_3)_2 \cdot 6H_2O$ | 11.84 g | 26.60 g | — |
| $Mn(NO_3)_2$ | — | — | 14.14 g |
| $C_6H_8O_7 \cdot H_2O$ | 15.67 g | 34.51 g | 24.56 g |
| Deionized $H_2O$ | 825 ml | 1820 ml | 1275 ml |

During the preparation, water was evaporated until the solution became a viscous gel and just began evolving $NO_2$ gas. The gel was then placed overnight in an oven set at about 90 degrees Celsius. The resulting spongy material was crushed and calcined at about 700 degrees Celsius for about 5 hours in static air. The temperature was ramped at a rate of about 10 degrees Celsius per minute. When the temperature reached just below about 300 degrees Celsius, the citrate ions combusted vigorously, causing a larger spike in temperature and powder displacement. For this reason the powder was covered with several layers of $ZrO_2$ balls (the same as used for ball milling) to prevent powder displacement, but still allow gas mobility. After calcination, the powder was ball milled with about 6.33 mL water/g powder for about 24 hours. Afterward, the slurry was stirred continuously, and about 0.33 mL of 0.1 M $HNO_3$/g powder and about 5 mL water/g powder was added to the slurry. The resulting washcoat solution had a concentration of about 0.114 gram catalyst/mL solution.

A cordierite substrate was dipped in the washcoat solution and excess liquid removed, and the wet substrate was set horizontally in an oven set to about 200 degrees Celsius for about 30 minutes. This procedure was repeated until the desired loading was obtained. Finally, the catalyst was calcined at about 700 degrees Celsius for about 5 hours with an air flow of about 100 sccm.

What is claimed is:

1. A catalytic oxidation reactor for oxidizing a nitric oxide component of an exhaust stream from a hydrocarbon fueled power source operated with a fuel lean combustion mixture, the catalytic oxidation reactor comprising:
   a substrate material having a front side portion and a rear side portion with respect to a flow direction of said exhaust stream;
   a first washcoat applied to said rear side portion of said substrate material, said first washcoat comprising a perovskite catalyst of the general formula $ABO_3$, wherein A comprises a rare earth metal from the Lanthanide Series and/or an alkaline-earth metal and B comprises a transition metal; and
   a second washcoat applied to the front side portion of said substrate material, said second washcoat comprising platinum, palladium, or a mixture of platinum and palladium.

2. The catalytic oxidation reactor of claim 1, wherein said perovskite catalyst is of the general formula $AA'BO_3$;
   wherein A comprises a rare earth metal from the Lanthanide Series and/or an alkaline-earth metal;
   wherein B comprises a transition metal; and
   wherein A' comprises a substitution of a promoter material for a portion of A.

3. The catalytic oxidation reactor of claim 1, wherein said perovskite catalyst is of the general formula $ABB'O_3$,
   wherein A comprises a rare earth metal from the Lanthanide Series and/or an alkaline-earth metal;
   wherein B comprises a transition metal; and
   wherein B' comprises a substitution of a promoter material for a portion of B.

4. The catalytic oxidation reactor of claim 1, wherein said perovskite catalyst is of the general formula $AA'BB'O_3$,
   wherein A comprises a rare earth metal from the Lanthanide Series and/or an alkaline-earth metal;
   wherein B comprises a transition metal;
   wherein A' comprises a substitution of a promoter material for a portion of A; and
   wherein B' comprises a substitution of a promoter material for a portion of B.

5. The catalytic oxidation reactor of claim 2, wherein A' comprises Strontium.

6. The catalytic oxidation reactor of claim 1, wherein A is Lanthanum.

7. The catalytic oxidation reactor of claim 6, wherein B is Cobalt or Manganese or Iron.

8. A system for reducing $NO_x$ and particulate matter emissions in an exhaust stream comprising:
   a catalytic oxidation reactor comprising a perovskite catalyst of the general formula $ABO_3$ coupled to a substrate material, wherein A comprises a rare earth metal from the Lanthanide Series and/or an alkaline-earth metal and wherein B comprises a transition metal;

a particulate filter; and a catalytic reduction reactor having a selective catalytic reduction catalyst.

9. The system of claim 8, wherein said perovskite catalyst said perovskite catalyst is of the general formula AA'BO$_3$;

wherein A comprises a rare earth metal from the Lanthanide Series and/or an alkaline-earth metal;

wherein B comprises a transition metal; and wherein A' comprises a substitution of a promoter material for a portion of A.

10. The system of claim 8, wherein said perovskite catalyst said perovskite catalyst is of the general formula ABB'O$_3$;

wherein A comprises a rare earth metal from the Lanthanide Series and/or an alkaline-earth metal;

wherein B comprises a transition metal; and wherein B' comprises a substitution of a promoter material for a portion of B.

11. The system of claim 8, wherein said perovskite catalyst said perovskite catalyst is of the general formula AA'BB'O$_3$;

wherein A comprises a rare earth metal from the Lanthanide Series and/or an alkaline-earth metal;

wherein B comprises a transition metal;

wherein A' comprises a substitution of a promoter material for a portion of A; and wherein B' comprises a substitution of a promoter material for a portion of B.

12. The system of claim 8, wherein said catalytic oxidation reactor further comprises:

a platinum based catalyst or a palladium based catalyst or a platinum and palladium based catalyst coupled to another portion of said substrate material.

13. The system of claim 8, wherein said catalytic oxidation reactor further comprises:

a platinum based catalyst or a palladium based catalyst or a platinum and palladium based catalyst coupled to said portion of said substrate material.

14. The system of claim 8 further comprising:

an injector device for injecting ammonia or urea to the exhaust stream before said catalytic reduction reactor.

15. The system of claim 14 further comprising:

a NO$_x$ sensor contained within the exhaust stream and coupled to said injector device, said NO$_x$ sensor located upstream of said catalytic reduction reactor.

16. The system of claim 14 further comprising:

a temperature sensor coupled to said catalytic reduction reactor and said injector device, said temperature sensor measuring a temperature of the selective catalytic reduction catalyst contained in said catalytic reduction reactor.

17. A method for removing NO$_x$ (NO and NO$_2$ in an exhaust stream from a hydrocarbon fueled power source operated with a fuel lean combustion mixture, the method comprising:

forming a catalytic oxidation reactor comprising a perovskite catalyst of the general formula ABO$_3$ coupled to a substrate material, wherein A comprises a rare earth metal from the Lanthanide Series and/or an alkaline-earth metal and wherein B comprises a transition metal;

passing the exhaust stream through said catalytic oxidation reactor to oxidize carbon monoxide, hydrocarbons, and NO;

injecting ammonia or urea into said exhaust stream at a location downstream from said catalytic oxidation reactor; and passing said exhaust stream with said ammonia or urea through a catalytic reduction reactor that includes a selective catalytic reduction catalyst to reduce NO$_x$ to N$_2$.

18. The method of claim 17, wherein forming catalytic oxidation reactor comprises:

forming a catalytic oxidation reactor comprising a perovskite catalyst of the general formula AA'BO$_3$ coupled to a substrate material, wherein A comprises a rare earth metal from the Lanthanide Series and/or an alkaline-earth metal, wherein B comprises a transition metal, and wherein A' comprises a substitution of a promoter material for a portion of A.

19. The method of claim 17, wherein forming catalytic oxidation reactor comprises:

forming a catalytic oxidation reactor comprising a perovskite catalyst of the general formula ABB'O$_3$ coupled to a substrate material, wherein A comprises a rare earth metal from the Lanthanide Series and/or an alkaline-earth metal, wherein B comprises a transition metal, and wherein B' comprises a substitution of a promoter material for a portion of B.

20. The method of claim 17, wherein forming catalytic oxidation reactor comprises:

forming a catalytic oxidation reactor comprising a perovskite catalyst of the general formula AA'BB'O$_3$ coupled to a substrate material, wherein A comprises a rare earth metal from the Lanthanide Series and/or an alkaline-earth metal, wherein B comprises a transition metal, wherein A' comprises a substitution of a promoter material for a portion of A, and wherein B' comprises a substitution of a promoter material for a portion of B.

* * * * *